(12) United States Patent
Chuang

(10) Patent No.: US 10,514,746 B2
(45) Date of Patent: Dec. 24, 2019

(54) DEVICE AND METHOD OF HANDLING POWER SAVING

(71) Applicant: ACER INCORPORATED, New Taipei (TW)

(72) Inventor: Ming-Dao Chuang, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 543 days.

(21) Appl. No.: 14/949,825

(22) Filed: Nov. 23, 2015

(65) Prior Publication Data
US 2016/0266634 A1 Sep. 15, 2016

Related U.S. Application Data

(60) Provisional application No. 62/130,632, filed on Mar. 10, 2015.

(51) Int. Cl.
*G06F 1/3209* (2019.01)
*H04W 52/02* (2009.01)
(Continued)

(52) U.S. Cl.
CPC .......... *G06F 1/3209* (2013.01); *G06F 1/3234* (2013.01); *H04W 52/0258* (2013.01);
(Continued)

(58) Field of Classification Search
CPC ................ G06F 1/3209; G06F 1/3234; H04W 52/0258; H04W 52/0206; H04W 52/0209;
(Continued)

(56) References Cited

U.S. PATENT DOCUMENTS

2007/0143637 A1* 6/2007 Tsai, Jr. ................ G06F 1/3215
713/300
2012/0108197 A1* 5/2012 Uchiyama ............. H04W 76/06
455/404.1
(Continued)

FOREIGN PATENT DOCUMENTS

EP 2 755 429 A1 7/2014
TW 201501558 A 1/2015
(Continued)

OTHER PUBLICATIONS

3GPP TS 24.301 V13.0.0 (Dec. 2014), Technical Specification, 3rd Generation Partnership Project; Technical Specification Group Core Network and Terminals; Non-Access-Stratum (NAS) protocol for Evolved Packet System (EPS); Stage 3 (Release 13), pp. 1-374, XP055282941.
(Continued)

Primary Examiner — Terrell S Johnson
(74) Attorney, Agent, or Firm — Winston Hsu

(57) ABSTRACT

A communication device of handling power saving comprises a storage unit for storing instructions and a processing means coupled to the storage unit. The processing means is configured to execute the instructions stored in the storage unit. The instructions comprise transmitting a first message comprising capability information to a first network entity, wherein the capability information indicates a plurality of power saving modes of the communication device; selecting a power saving mode from the plurality of power saving modes; and transmitting a second message comprising the power saving mode and at least one power saving parameter related to the power saving mode to a second network entity.

22 Claims, 12 Drawing Sheets

(51) Int. Cl.
*G06F 1/3234* (2019.01)
*H04W 52/58* (2009.01)
*H04W 52/36* (2009.01)

(52) U.S. Cl.
CPC .......... *Y02D 70/00* (2018.01); *Y02D 70/1224* (2018.01); *Y02D 70/1242* (2018.01); *Y02D 70/1262* (2018.01); *Y02D 70/1264* (2018.01); *Y02D 70/21* (2018.01); *Y02D 70/24* (2018.01)

(58) Field of Classification Search
CPC .... H04W 52/365; H04W 52/58; Y02B 60/50; Y02D 70/00; Y02D 70/1224; Y02D 70/1242; Y02D 70/1262; Y02D 70/1264; Y02D 70/21; Y02D 70/24
See application file for complete search history.

(56) References Cited

U.S. PATENT DOCUMENTS

| | | | |
|---|---|---|---|
| 2013/0039232 A1 | 2/2013 | Kim | |
| 2013/0159478 A1* | 6/2013 | Rousu | H04W 52/0229 709/221 |
| 2013/0343252 A1* | 12/2013 | Chakraborty | H04W 52/0261 370/311 |
| 2014/0044029 A1* | 2/2014 | Chou | H04W 52/0212 370/311 |
| 2014/0092799 A1 | 4/2014 | Jain | |
| 2014/0254452 A1* | 9/2014 | Golitschek Edler Von Elbwart | H04W 52/0216 370/311 |
| 2015/0029918 A1* | 1/2015 | Bangolae | H04W 4/70 370/311 |
| 2015/0043403 A1* | 2/2015 | Martinez Tarradell | H04W 76/14 370/311 |

FOREIGN PATENT DOCUMENTS

| | | |
|---|---|---|
| WO | 2013006196 A1 | 1/2013 |
| WO | 2014135001 A1 | 9/2014 |
| WO | 2014177184 A1 | 11/2014 |

OTHER PUBLICATIONS

3GPP TS 36.306 V12.3.0 (Dec. 2014), Technical Specification, 3rd Generation Partnership Project; Technical Specification Group Radio Access Network; Evolved Universal Terrestrial Radio Access (E-UTRA), User Equipment (UE) radio access capabilities (Release 12), pp. 1-36, XP055282953.

ETSI, LTE; Evolved Universal Terrestrial Radio Access (E-UTRA); Radio Resource Control (RRC); Protocol specification (3GPP TS 36.331 version 12.3.0 Release 12), ETSI TS 136 331 V12.3.0, Sep. 2014, XP055263548.

\* cited by examiner

DEVICE AND METHOD OF HANDLING POWER SAVING

CROSS REFERENCE TO RELATED APPLICATIONS

This application claims both the benefit of U.S. Provisional Application No. 62/130,632, filed on Mar. 10, 2015 and incorporated herein by reference.

BACKGROUND OF THE INVENTION

1. Field of the Invention

The present invention relates to a communication device and a method used in a wireless communication system, and more particularly, to a communication device and a method of handling power saving in a wireless communication system.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint (COMP) transmissions/reception, uplink (UL) multiple-input multiple-output (UL-MIMO), etc. For a UE and an eNB to communicate with each other in the LTE-A system, the UE and the eNB must support standards developed for the LTE-A system, such as the 3GPP Rel-10 standard or later versions.

The eNB and the UE may support a plurality of power saving modes (i.e., multiple power saving methods). The UE may decrease power consumption by using a power saving mode of the plurality of power saving modes. However, operations of the power saving modes may be different, and may be suitable for different scenarios. Hence, how to select a power saving mode from the power saving mods is an important topic to be discussed. In addition, how to handle interaction (e.g., switching) of the power saving modes is an important topic to be discussed.

SUMMARY OF THE INVENTION

The present invention therefore provides a communication device and a method for handling power saving to solve the abovementioned problem.

A communication device of handling power saving comprises a storage unit for storing instructions and a processing means coupled to the storage unit. The processing means is configured to execute the instructions stored in the storage unit. The instructions comprise transmitting a first message comprising capability information to a first network entity, wherein the capability information indicates a plurality of power saving modes of the communication device; selecting a power saving mode from the plurality of power saving modes; and transmitting a second message comprising the power saving mode and at least one power saving parameter related to the power saving mode to a second network entity.

A communication device of handling power saving comprises a storage unit for storing instructions and a processing means coupled to the storage unit. The processing means is configured to execute the instructions stored in the storage unit. The instructions comprise selecting a power saving mode from a plurality of power saving modes of the communication device; and transmitting a message comprising capability information, the power saving mode and at least one power saving parameter related to the power saving mode to a network entity, wherein the capability information indicates the plurality of power saving modes.

A communication device of handling power saving comprises a storage unit for storing instructions and a processing means coupled to the storage unit. The processing means is configured to execute the instructions stored in the storage unit. The instructions comprise operating in a first power saving mode of a plurality of power saving modes; and switching from the first power saving mode to a second power saving mode of the plurality of power saving modes, if a data transmission or a paging does not occur within a time period.

A communication device of handling power saving comprises a storage unit for storing instructions and a processing means coupled to the storage unit. The processing means is configured to execute the instructions stored in the storage unit. The instructions comprise receiving an indication transmitted from a network entity when operating in a first power saving mode of a plurality of power saving modes, wherein the indication indicates a time instant and/or a frequency for a reception of data from another communication device; and switching from a second power saving mode of the plurality of power saving modes back to the first power saving mode according to the time instant and/or the frequency.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
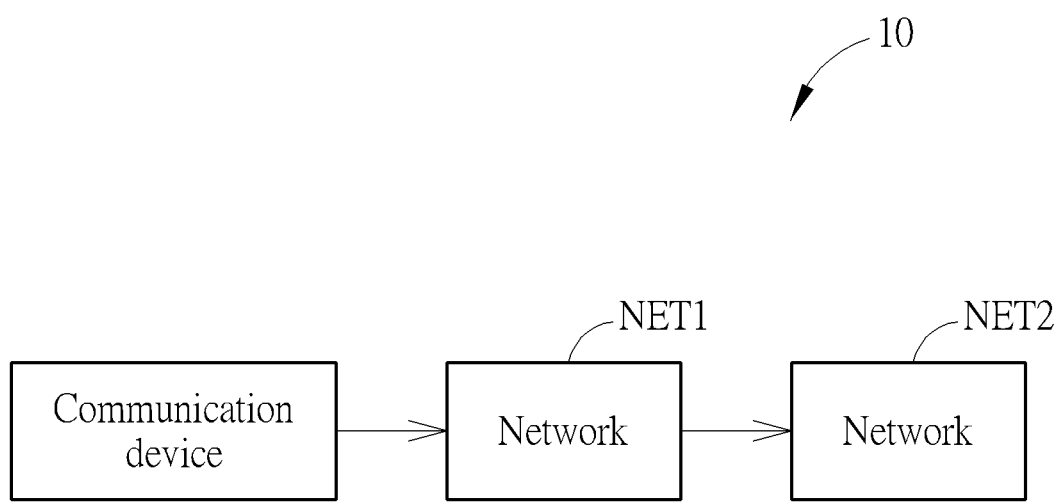
FIG. 1 is a schematic diagram of a wireless communication system according to an example of the present invention.

FIG. 1 is a schematic diagram of a wireless communication system 10 according to an example of the present invention. The wireless communication system 10 is briefly composed of a communication device, networks NET1 and NET2. In FIG. 1, the networks NET1 and NET2 and the communication device are simply utilized for illustrating the structure of the wireless communication system 10. Practically, the network NET1 can be a universal terrestrial radio access network (UTRAN) comprising at least one Node-B (NB) in a universal mobile telecommunications system (UMTS). In another example, the network NET1 can be an evolved UTRAN (E-UTRAN) comprising at least one evolved NB (eNB) and/or at least one relay in a long term evolution (LTE) system, a LTE-Advanced (LTE-A) system or an evolution of the LTE-A system. The network NET2 may include a core network which includes network entities such as Mobility Management Entity (MME), mobile switching center/serving GPRS support node (MSC)/(SGSN), Serving Gateway (S-GW), Packet Data Network (PDN) Gateway (P-GW), Self-Organizing Networks (SON) server and/or Radio Network Controller (RNC), etc.

After the network NET1 (e.g., UTRAN and/or E-UTRAN) receive information transmitted by the communication device, the information may be processed only by the network NET1 and decisions corresponding to the information are made at the network NET1. Alternatively, the network NET1 may forward the information to the network NET2 (e.g., MME and/or MSC/SGSN), and the decisions corresponding to the information are made at the network NET2 after the network NET2 processes the information. In addition, the information can be processed by both the network NET1 and the network NET2, and the decisions are made after coordination and/or cooperation are performed by the network NET1 and the network NET2.

A communication device can be a user equipment (UE), a low cost device (e.g., machine type communication (MTC) device), a device-to-device (D2D) device, a mobile phone, a laptop, a tablet computer, an electronic book, a portable computer system, or combination thereof. In addition, the networks and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
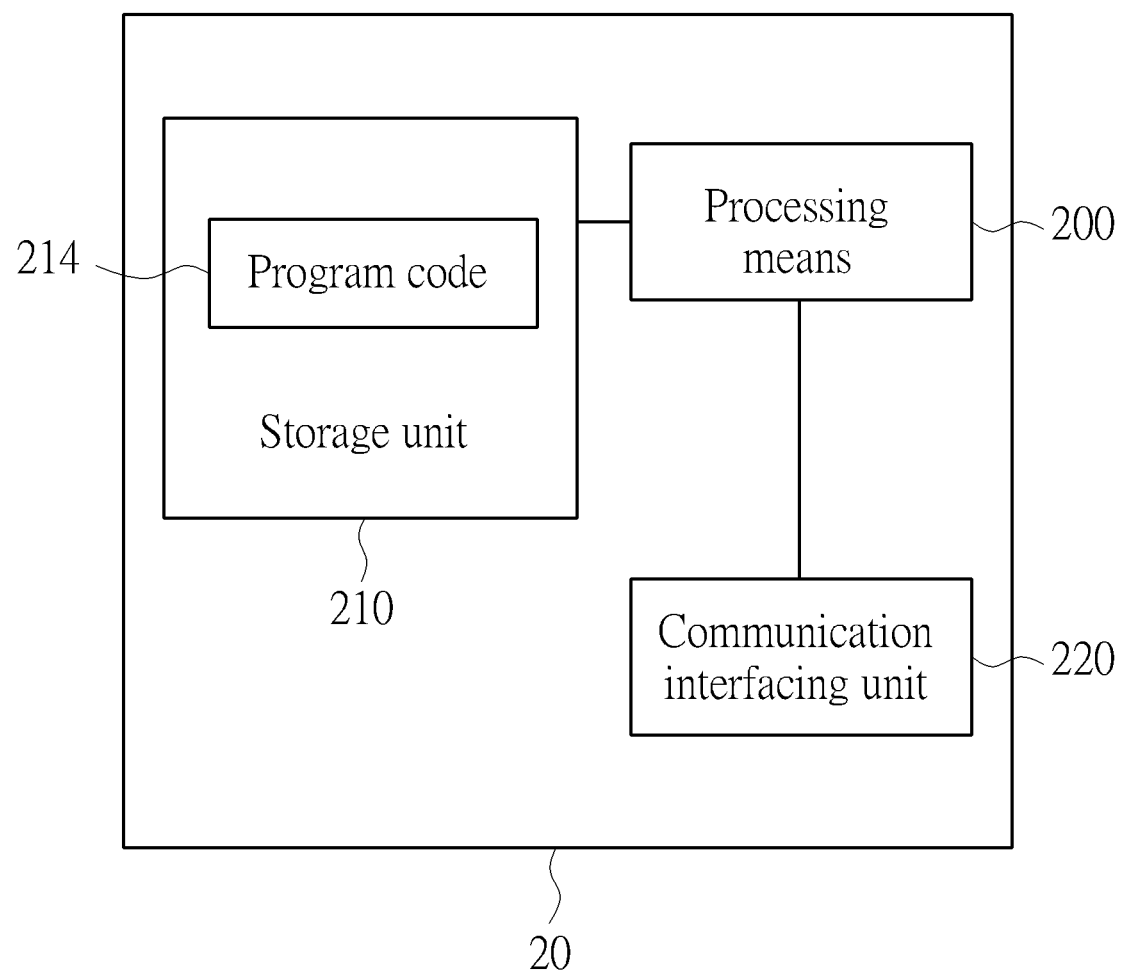
FIG. 2 is a schematic diagram of a communication device according to an example of the present invention.

FIG. 2 is a schematic diagram of a communication device 20 according to an example of the present invention. The communication device 20 may be the communication device, the network NET1 and/or the network NET2 shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that may store a program code 214, accessed and executed by the processing means 200. Examples of the storage unit 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage unit, non-transitory computer-readable medium (e.g., tangible media), etc. The communication interfacing unit 220 is preferably a transceiver and is used to transmit and receive signals (e.g., data, signals, messages and/or packets) according to processing results of the processing means 200.

Figure 3:
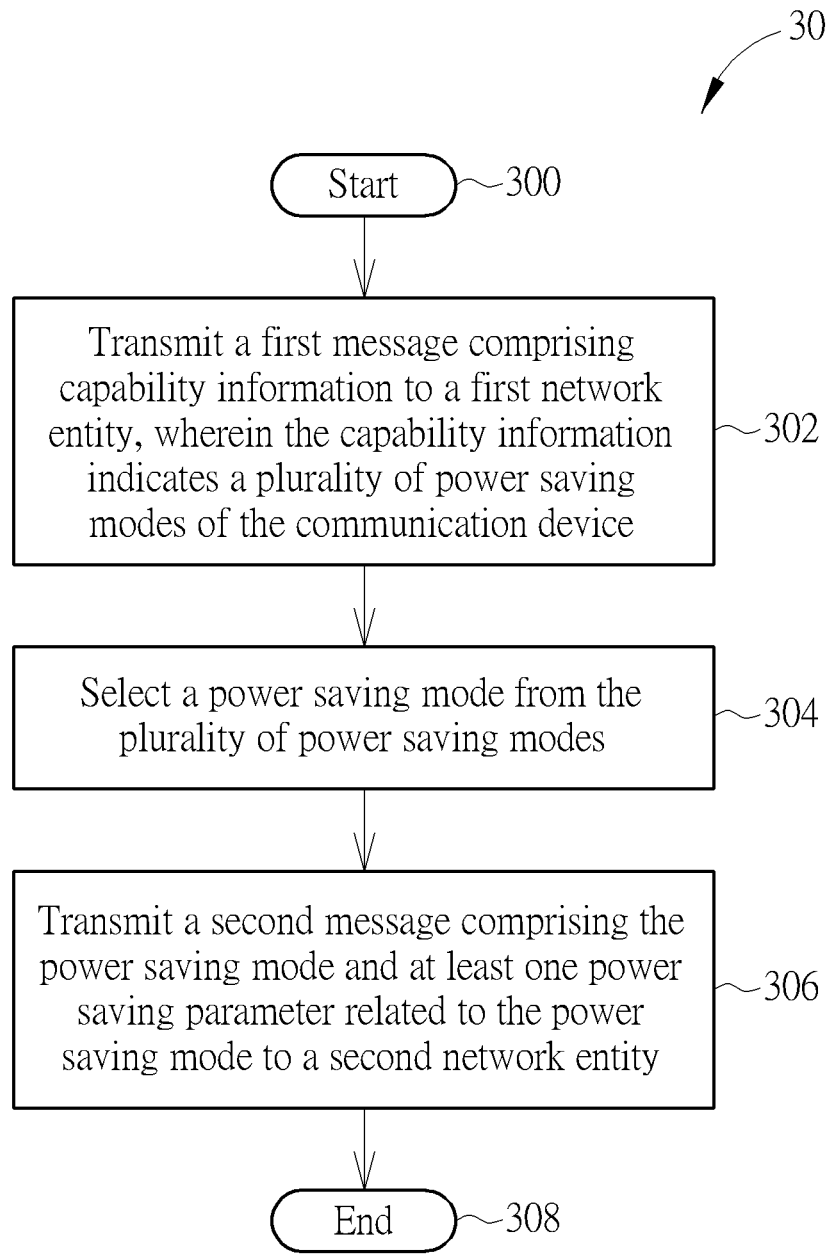
FIG. 3 is a flowchart of a process according to an example of the present invention.

FIG. 3 is a flowchart of process 30 according to an example of the present invention. The process 30 may be utilized in a communication device (e.g., the communication device in FIG. 1) to handle power saving. The process 30 may be complied into the program code 214 and includes the following steps:

Step 300: Start.

Step 302: Transmit a first message comprising capability information to a first network entity, wherein the capability information indicates a plurality of power saving modes of the communication device.

Step 304: Select a power saving mode from the plurality of power saving modes.

Step 306: Transmit a second message comprising the power saving mode and at least one power saving parameter related to the power saving mode to a second network entity.

Step 308: End.

According to the process 30, the communication device may transmit a first message comprising capability information to a first network entity (e.g., the network NET1 in FIG. 1), wherein the capability information indicates a plurality of power saving modes of the communication device. The communication device may select a power saving mode from the plurality of power saving modes. Then, the communication may transmit a second message comprising the power saving mode and at least one power saving parameter related to the power saving mode to a second network entity (e.g., the network NET2 in FIG. 1). That is, the plurality of power saving modes and the selected power saving mode are indicated via the capability information of the first message and the second message, respectively. Thus, information of the power saving modes may be notified to the first network entity and the second network.

Realization of the present invention is not limited to the above description. The following example may be applied to the process 30.

In one example, in the LTE system, the first message may be a UE Capability Information message, the first network entity may be a base station (e.g., eNB), and the capability information may be an information element (IE) "UE-EUTRA-Capability". The second message may be an attach/tracking area update (TAU) request message and the second network entity may be a MME. In one example, in the UMTS, the first message may be a radio resource control (RRC) Connection Setup Complete message, the first network entity may be a radio network controller (RNC), and the capability information is an IE "UE radio access capability". The second message may be an attach/routing area update (RAU) request message and the second network entity may be a mobile switching center/serving GPRS support node (MSC)/(SGSN).

In one example, the power saving mode may be indicated by an IE "current power saving way" in the second message. The communication device may transmit the first message to the first network entity, when performing a registration procedure. In addition, the first message and the second message may be transmitted via a RRC layer. The plurality of power saving modes may include an extended discontinuous reception (eDRX) and a power saving mode (PSM). In one example, the power saving mode may be the eDRX, and the at least one power saving parameter may include an extended long paging DRX indicator and/or a UE specific extended long paging DRX indicator. In another example, the power saving mode may be the PSM, and the at least one power saving parameter may include a preferred periodic updating timer and/or a preferred active timer.

That is, the first message for the first network entity and the second message for the second network entity may be determined according to the wireless communication system (e.g., LTE system or UMTS) where the communication device is operated. Then, the information of the power saving modes may be transmitted to the corresponding network entities.

Figure 4:
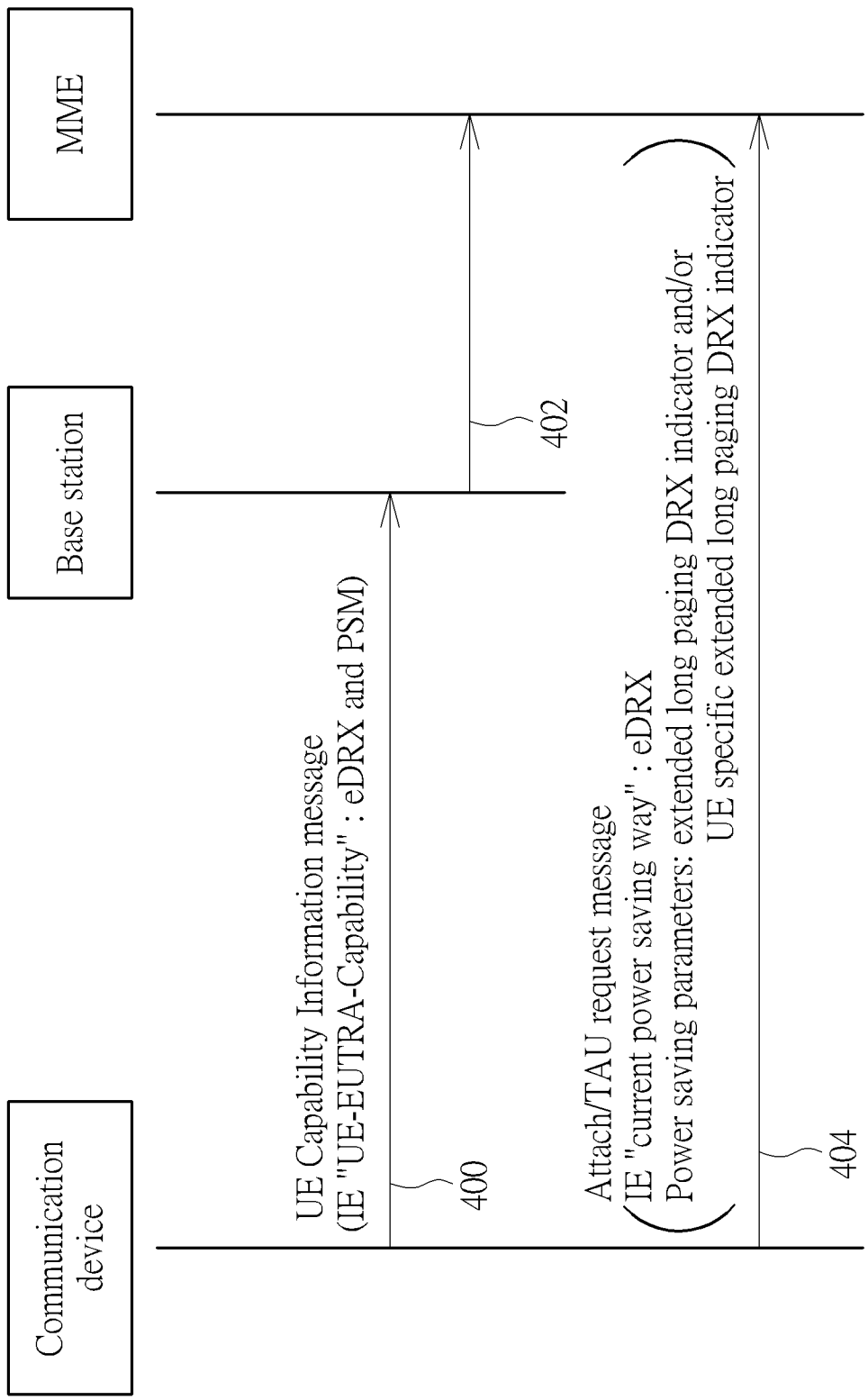
FIG. 4 is a schematic diagram of transmissions of information of power saving modes in the LTE system according to an example of the present invention.

FIG. 4 is a schematic diagram of transmissions of information of power saving modes in the LTE system according to an example of the present invention. A communication device may transmit a UE Capability Information message (e.g., the first message in the process 30) to a base station (e.g., the first network entity in the process 30) via a RRC layer (step 400), when the communication device performs a registration procedure. The UE Capability Information message may include an IE "UE-EUTRA-Capability" (e.g., the capability information in the process 30), wherein the IE "UE-EUTRA-Capability" may include an eDRX and a PSM (e.g., the plurality of power saving modes in the process 30). That is, the communication device may indicate its power saving modes by transmitting the UE Capability Information message to the base station. Then, the base station may transmit a UE Capability Information indication message including an IE "UE Radio Capability" to a MME (step 402), wherein the IE "UE Radio Capability" may include the eDRX and the PSM.

In addition, the communication device may select a power saving mode (e.g., eDRX) from the eDRX and the PSM. The communication device may transmit an attach/TAU message (e.g., the second message in the process 30) to the MME (e.g., the second network entity in the process 30) via the RRC layer (step 402), after completing a selection of the power saving mode. The attach/TAU request message may include the IE "current power saving way" for indicating the selected power saving mode and power saving parameters related to (e.g., corresponding to) the selected power saving mode. In detail, the power saving parameters may include an extended long paging DRX indicator and/or an UE specific extended long paging DRX indicator (e.g., the at least one power saving parameter in the process 30), when the IE "current power saving way" is the eDRX (i.e., the selected power saving mode). That is, the power saving parameters may be determined according to the selected power saving mode.

Figure 5:
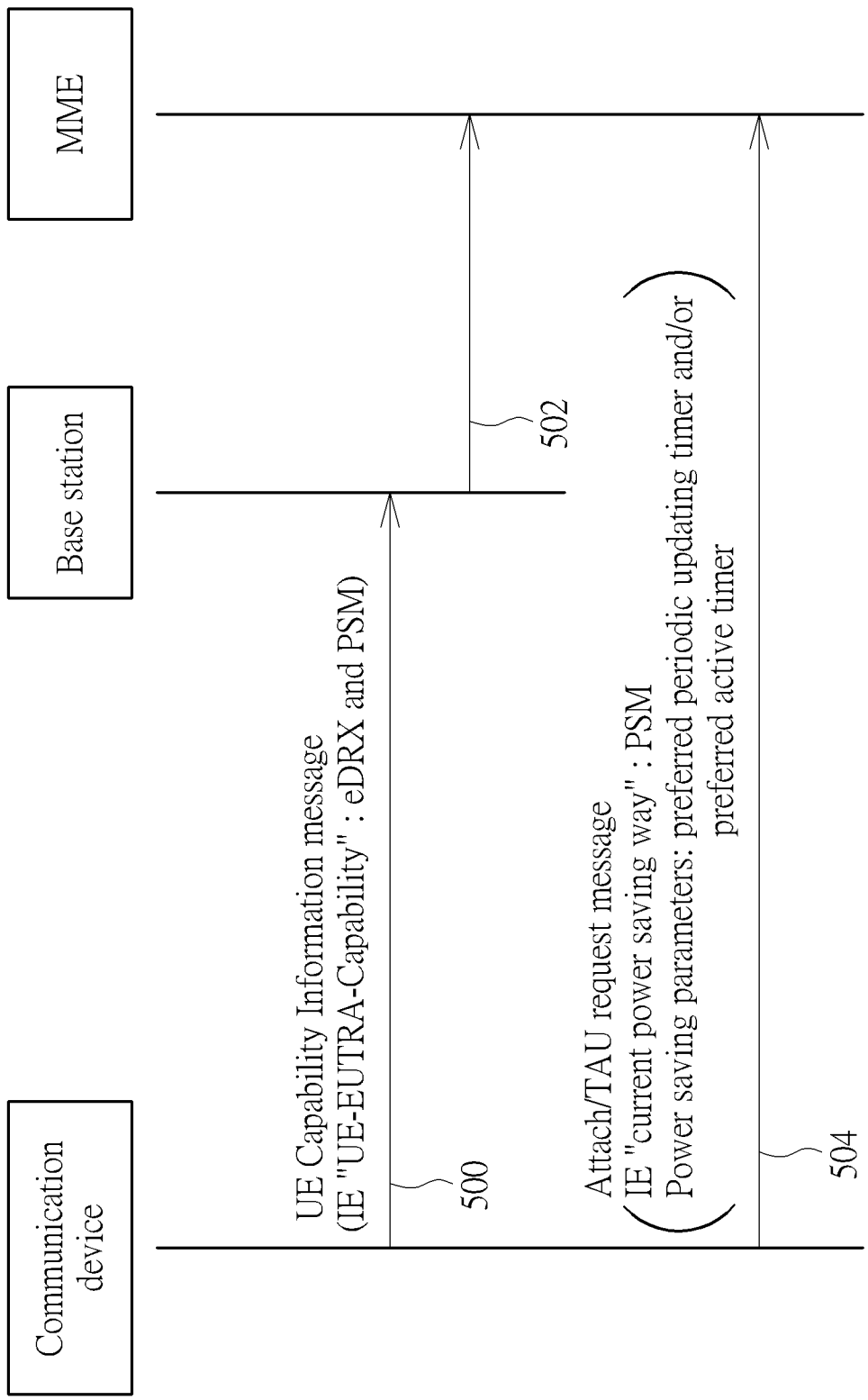
FIG. 5 is a schematic diagram of transmissions of information of power saving modes in the LTE system according to an example of the present invention.

FIG. 5 is a schematic diagram of transmissions of information of power saving modes in the LTE system according to an example of the present invention. Detailed operations of step 500 may be referred to step 400 of FIG. 4. A communication device may indicate its power saving modes by transmitting a UE Capability Information message to a base station. Then, the base station may transmit a UE Capability Information indication message including an IE "UE Radio Capability" to a MME (step 502), wherein the IE "UE Radio Capability" may include the eDRX and the PSM.

In addition, the communication device may select a power saving mode (e.g., PSM) from the eDRX and the PSM. The communication device may transmit an attach/TAU message (e.g., the second message in the process 30) to the MME (e.g., the second network entity in the process 30) via a RRC layer in (step 504), after completing the selection of the power saving mode. The attach/TAU request message may include the IE "current power saving way" for indicating the selected power saving mode and power saving parameters related to (e.g., corresponding to) the selected power saving mode. In detail, the power saving parameters may include a preferred periodic updating timer and/or a preferred active timer (e.g., the at least one power saving parameter in the process 30), when the IE "current power saving way" is the PSM (i.e., the selected power saving mode). That is, the power saving parameters may be determined according to the selected power saving mode.

Figure 6:
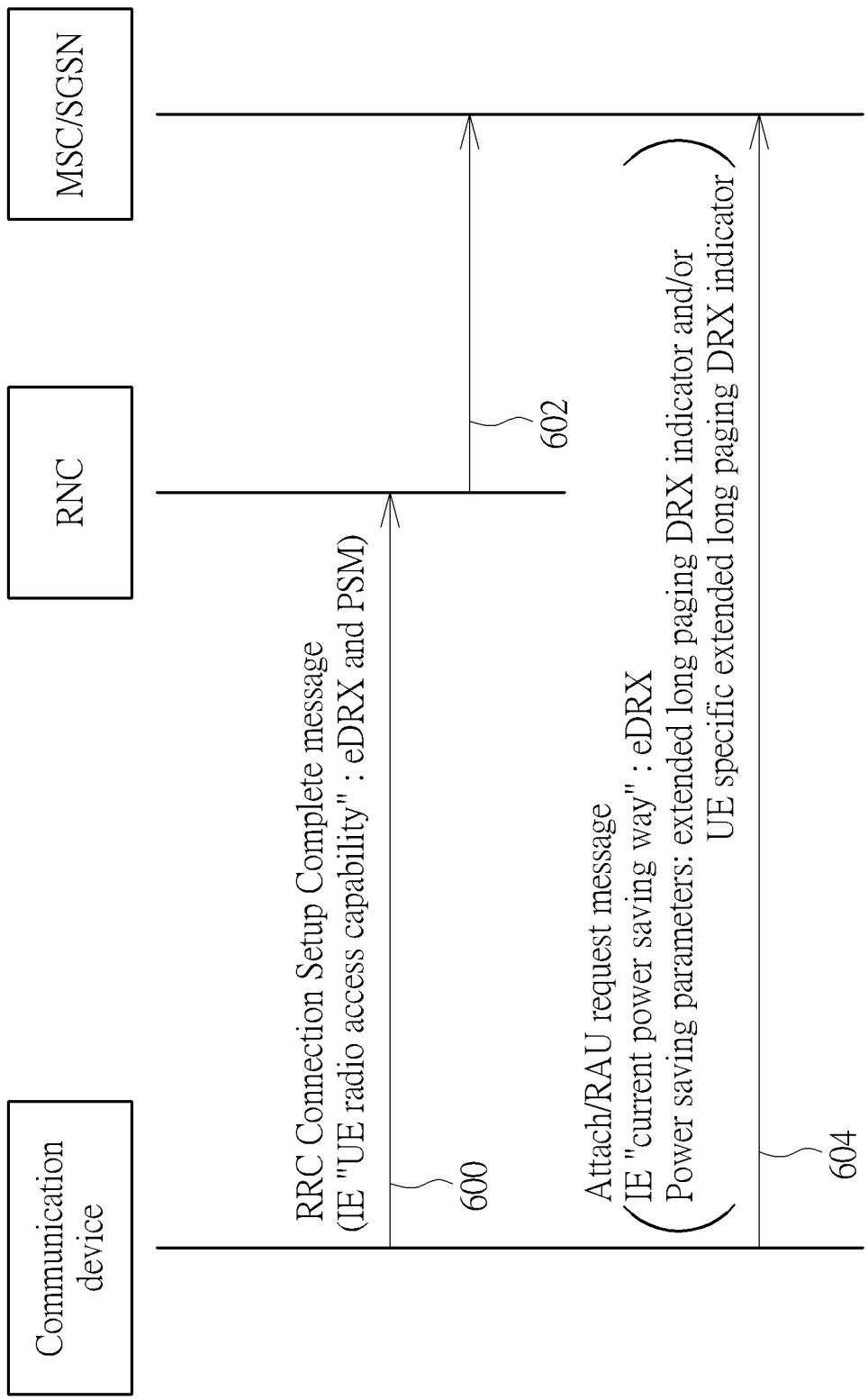
FIG. 6 is a schematic diagram of transmissions of information of power saving modes in the UMTS according to an example of the present invention.

FIG. 6 is a schematic diagram of transmissions of information of power saving modes in the UMTS according to an example of the present invention. A communication device may transmit a RRC Connection Setup Complete message (e.g., the first message in the process 30) to a RNC (e.g., the first network entity in the process 30) via a RRC layer (step 600), when the communication device performs a registration procedure. The RRC Connection Setup Complete message may include an IE "UE radio access capability" (e.g., the capability information in the process 30), wherein the IE "UE radio access capability" may include an eDRX and a PSM (e.g., the plurality of power saving modes in the process 30). That is, the communication device may indicate its power saving modes by transmitting the RRC Connection Setup Complete message to the RNC. Then, the RNC may transmit a UE Radio Capability Match Response message including an IE "UE Radio Capability" to a MSC/SGSN (step 602), wherein the IE "UE Radio Capability" may include the eDRX and the PSM.

In addition, the communication device may select a power saving mode (e.g., eDRX) from the eDRX and the PSM. The communication device may transmit an attach/RAU message (e.g., the second message in the process 30) to the MSC/SGSN (e.g., the second network entity in the process 30) via the RRC layer in (step 604), after completing the selection of the power saving mode. The attach/RAU request message may include an IE "current power saving way" for indicating the selected power saving mode and power saving parameters related to (e.g., corresponding to) the selected power saving mode. In detail, the power saving parameters may include an extended long paging DRX indicator and/or a UE specific extended long paging DRX indicator (e.g., the at least one power saving parameter in the process 30), when the IE "current power saving way" is the eDRX (i.e., the selected power saving mode). That is, the power saving parameters may be determined according to the selected power saving mode.

Figure 7:
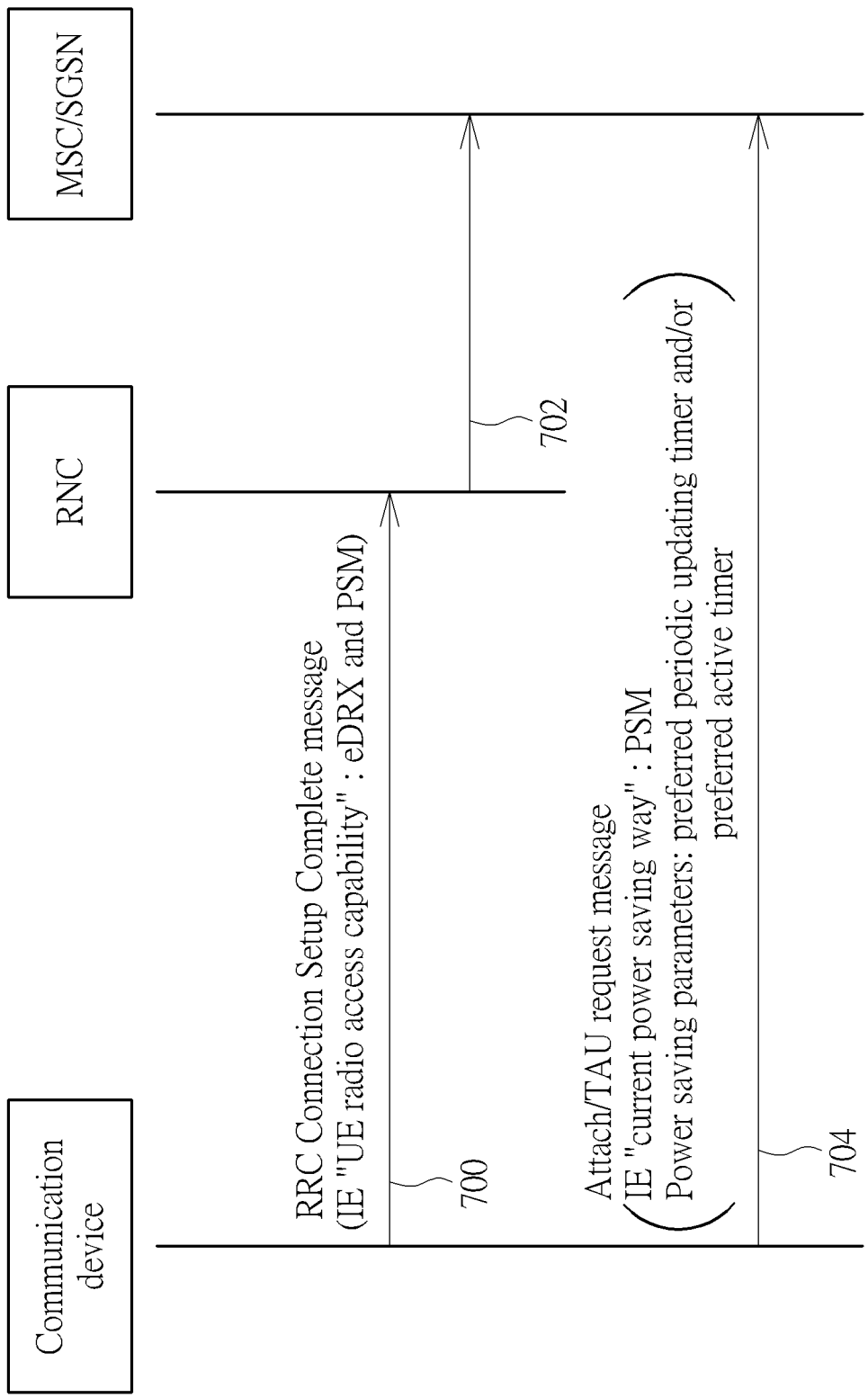
FIG. 7 is a schematic diagram of transmissions of information of power saving modes in the UMTS according to an example of the present invention.

FIG. 7 is a schematic diagram of the transmission of information of power saving modes in the UMTS according to an example of the present invention. Detailed operations of step 700 may be referred to step 600 of FIG. 6. A communication device may indicate its power saving modes by transmitting a RRC Connection Setup Complete message to a RNC. Then, the RNC may transmit a UE Capability Information indication message including an IE "UE Radio Capability" to a MSC/SGSN (step 702), wherein the IE "UE Radio Capability" may include the eDRX and the PSM.

In addition, the communication device may select a power saving mode (e.g., PSM) from the eDRX and the PSM. The communication device may transmit an attach/RAU message (e.g., the second message in the process 30) to the MSC/SGSN (e.g., the second network entity in the process 30) via the RRC layer in (step 704), after completing the selection of the power saving mode. The Attach/RAU request message may include an IE "current power saving way" for indicating the selected power saving mode and power saving parameters related to (e.g., corresponding to) the selected power saving mode. In detail, the power saving parameter may include a preferred periodic updating timer and/or a preferred active timer (e.g., the at least one power saving parameter in the process 30), when the IE "current power saving way" is the PSM (i.e., the selected power saving mode). That is, the power saving parameters may be determined according to the selected power saving mode.

As a result, according to the above description, the information of the power saving modes may be transmitted to the network entities via the corresponding messages in the RRC layer, even though the communication device is in the different wireless communication system (e.g., LTE or UMTS).

Figure 8:
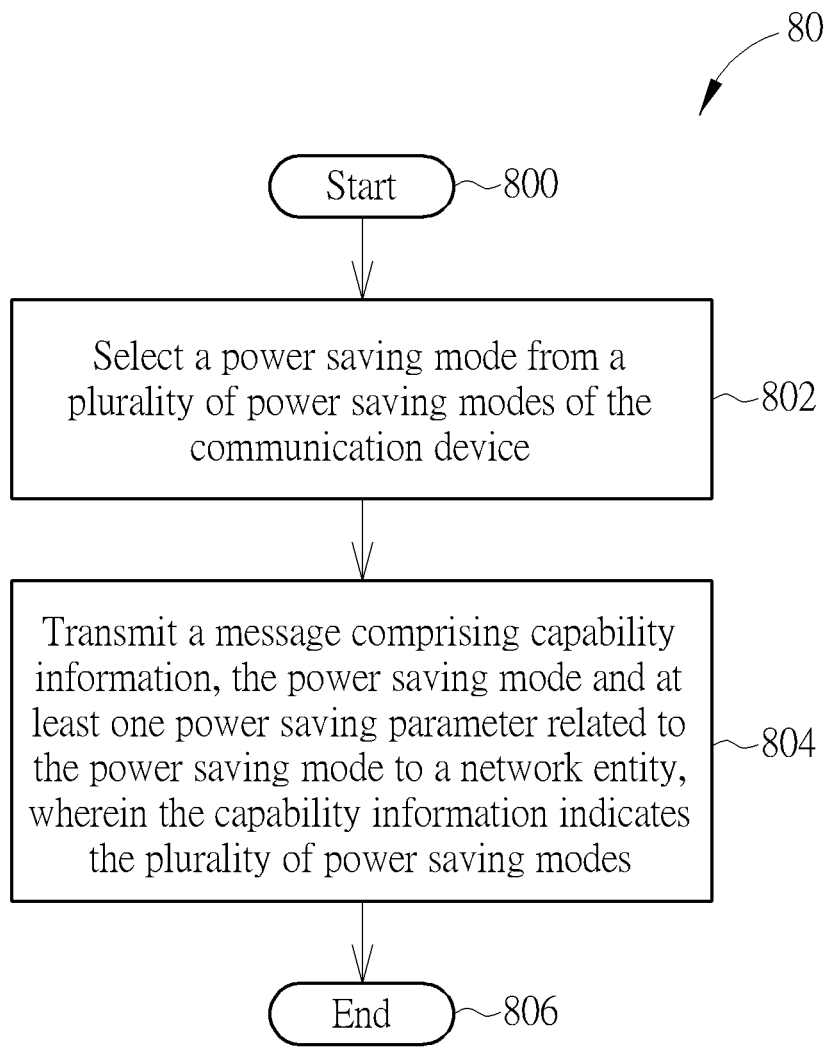
FIG. 8 is a flowchart of a process according to an example of the present invention.

FIG. 8 is a flowchart of process 80 according to an example of the present invention. The process 80 may be utilized in a communication device (e.g., the communication device in FIG. 1) to handle power saving. The process 80 may be complied into the program code 214 and includes the following steps:

Step 800: Start.

Step 802: Select a power saving mode from a plurality of power saving modes of the communication device.

Step 804: Transmit a message comprising capability information, the power saving mode and at least one power saving parameter related to the power saving mode to a network entity, wherein the capability information indicates the plurality of power saving modes.

Step 806: End.

According to the process 80, the communication device may select a power saving mode from the plurality of power saving modes of the communication device. Then, the communication may transmit a message comprising capability information, the power saving mode and at least one power saving parameter related to the power saving mode to a network entity (e.g., the network NET1 in FIG. 1), wherein the capability information indicates the plurality of power saving modes. That is, the plurality of power saving modes and the selected power saving mode are indicated via the message. Thus, information of the power saving modes may be notified to the network entity via the message.

Realization of the present invention is not limited to the above description. The following example may be applied to the process 80.

In one example, the message may be an attach/routing area update (RAU)/TAU request message and is transmitted via a NAS layer. The capability information may be an IE "MS network capability". The network entity may include the MME or the MSC/SGSN. In addition, the power saving mode may be indicated by the IE "current power saving way" in the message. The plurality of power saving modes may include the eDRX and the PSM. In one example, the power saving mode may be the eDRX, and the at least one power saving parameter may include the extended long paging DRX indicator and/or the UE specific extended long paging DRX indicator. In another example, the power saving mode may be the PSM, and the at least one power saving parameter may include the preferred periodic updating timer and/or the preferred active timer.

Figure 9:
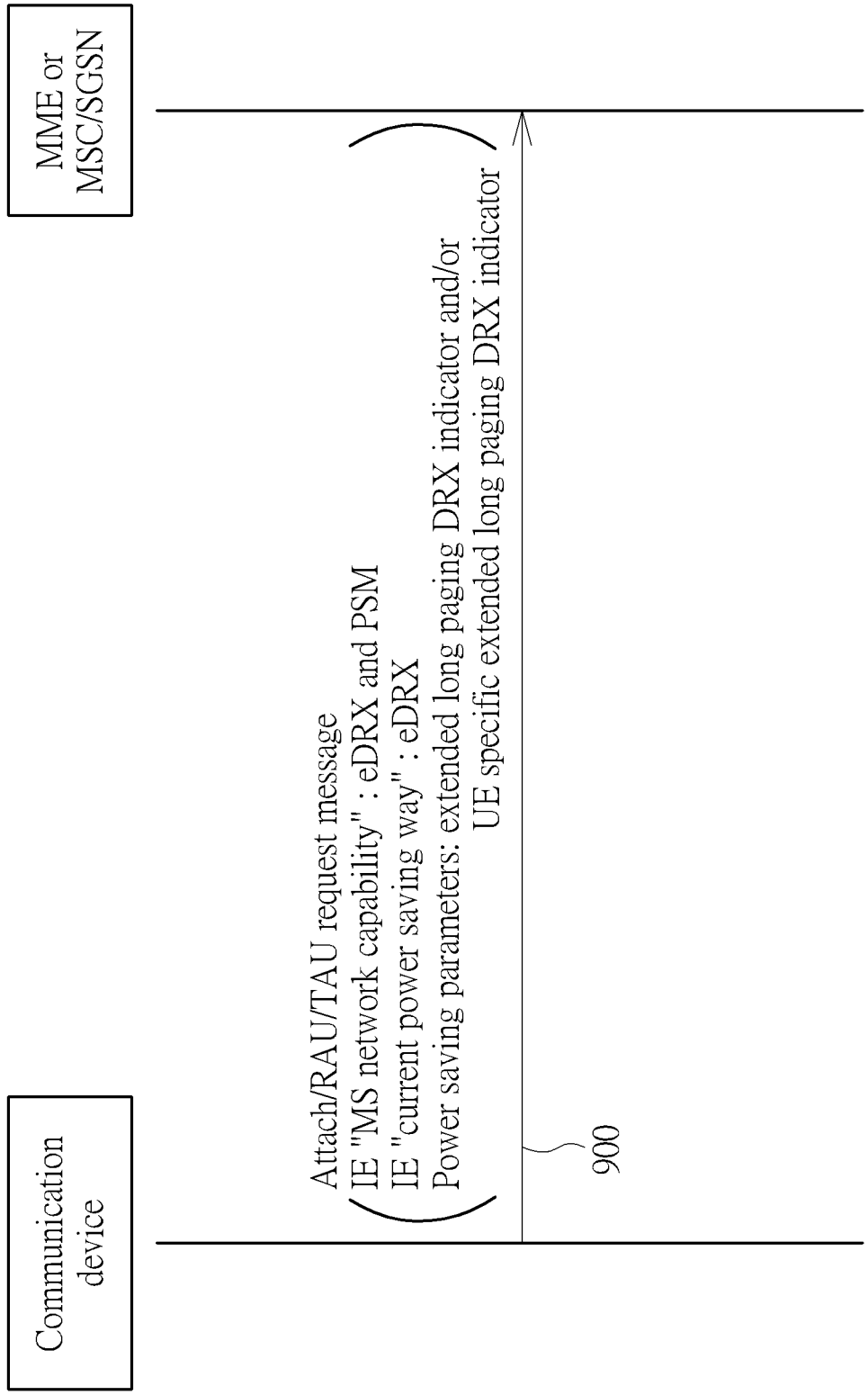
FIG. 9 is a schematic diagram of transmissions of information of power saving modes according to an example of the present invention.

FIG. 9 is a schematic diagram of transmissions of information of power saving modes according to an example of the present invention. A communication device may select a power saving mode from an eDRX and a PSM (e.g., the plurality of power saving modes in the process 80) of the communication device. Further, the communication device may transmit an attach/RAU/TAU request message (e.g., the message in the process 80) to a MME or a MSC/SGSN (e.g., the network entity in the process 80) via a NAS layer (step 900), after completing the selection of the power saving mode. The attach/RAU/TAU request message may include an IE "MS network capability" (e.g., the capability information in the process 80), an IE "current power saving way" for indicating the power saving modes of the communication device, the selected power saving mode, and power saving parameters related to (e.g., corresponding to) the selected power saving mode.

In detail, the power saving parameters may include an extended long paging DRX indicator and/or a UE specific extended long paging DRX indicator (e.g., at least one power saving parameter in the process 80), when the IE "current power saving way" is the eDRX (i.e., the selected power saving mode). That is, the power saving parameters may be determined according to the selected power saving mode.

Figure 10:
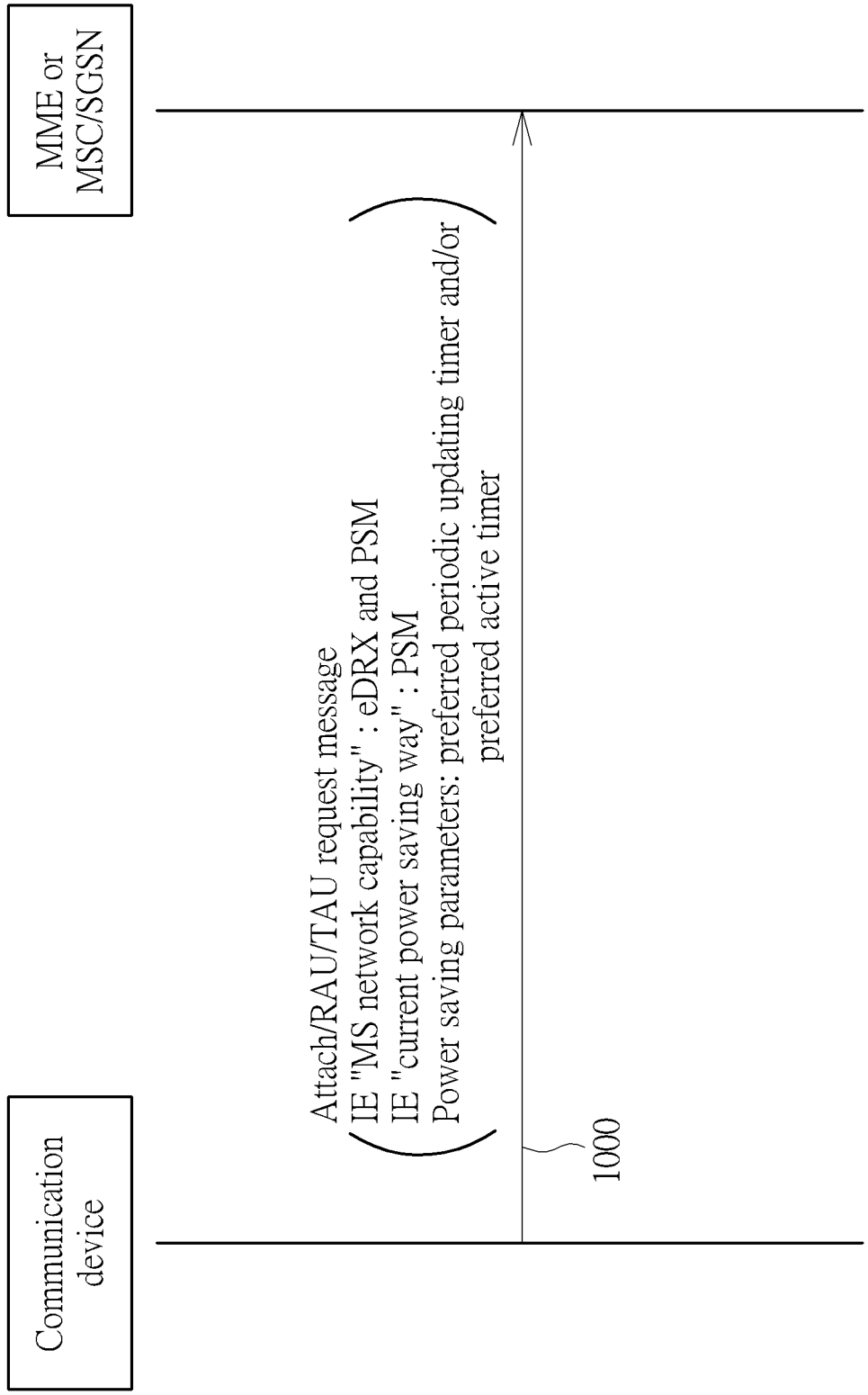
FIG. 10 is a schematic diagram of transmissions of information of power saving modes according to an example of the present invention.

FIG. 10 is a schematic diagram of transmissions of information of power saving modes according to an example of the present invention. A communication device may select a power saving mode from an eDRX and a PSM (e.g., the plurality of power saving modes in the process 80) of the communication device. Detailed operations of an attach/RAU/TAU request message in step 1000 may be referred to step 900 of FIG. 9. The attach/RAU/TAU request message may include an IE "MS network capability" (e.g., the capability information in the process 80), an IE "current power saving way" for indicating the power saving modes of the communication device, the selected power saving mode, and power saving parameters related to (e.g., corresponding to) the selected power saving mode.

In detail, the power saving parameters may include a preferred periodic updating timer and/or a preferred active timer (e.g., the at least one power saving parameter in the process 80), when the IE "current power saving way" is the PSM (i.e., the selected power saving mode). That is, the power saving parameters may be determined according to the selected power saving mode.

As a result, according to the above description, the information of the power saving modes may be transmitted to the network entity via the corresponding message in the NAS layer, even though the communication device is in the different wireless communication system (e.g., LTE or UMTS).

Figure 11:
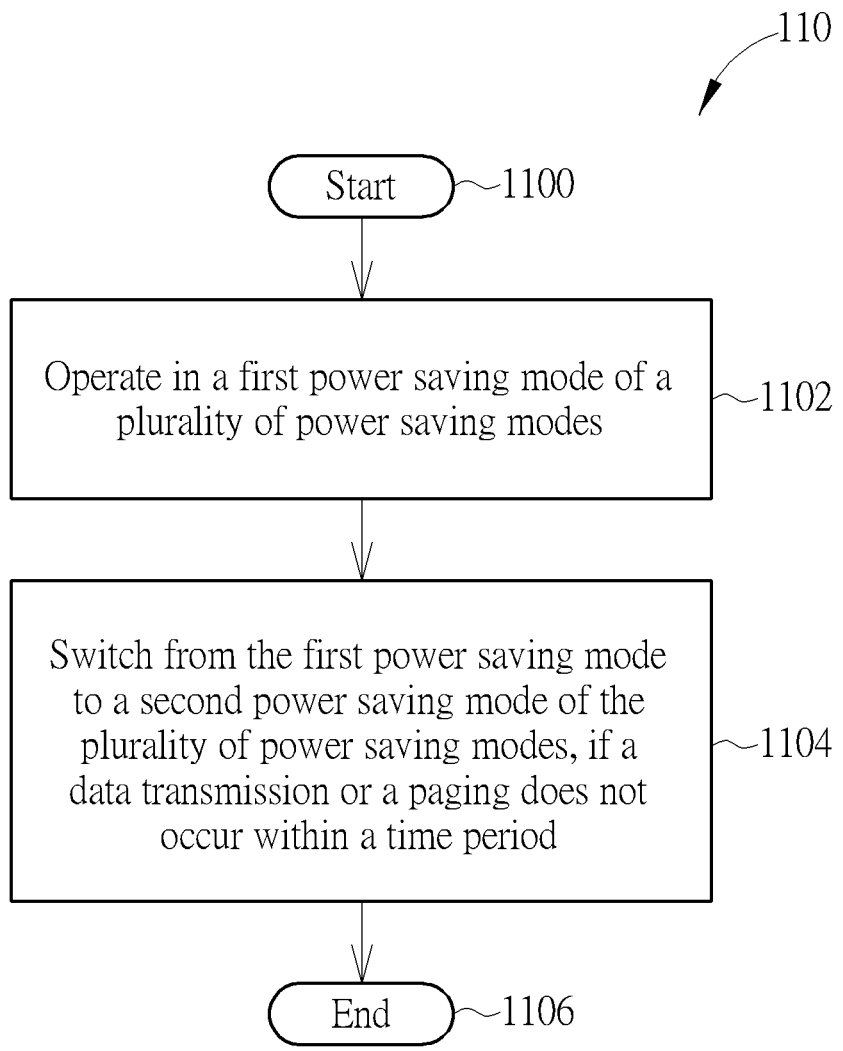
FIG. 11 is a flowchart of a process according to an example of the present invention.

FIG. 11 is a flowchart of process 110 according to an example of the present invention. The process 110 may be utilized in a communication device (e.g., the communication device in FIG. 1) to handle power saving. The process 110 may be complied into the program code 214 and includes the following steps:

Step 1100: Start.

Step 1102: Operate in a first power saving mode of a plurality of power saving modes.

Step 1104: Switch from the first power saving mode to a second power saving mode of the plurality of power saving modes, if a data transmission or a paging does not occur within a time period.

Step 1106: End.

According to the process 110, the communication device may operate in a first power saving mode of a plurality of power saving modes. Then, the communication device may switch from the first power saving mode to a second power saving mode of the plurality of power saving modes, if a data transmission or a paging does not occur within a time period. That is, the communication device may switch to the second power saving mode to reduce more power consumption, if the data transmission or the paging does not occur within the time period.

Realization of the present invention is not limited to the above description. The following example may be applied to the process 110.

In one example, the first power saving mode may be the eDRX and the second power saving mode may be the PSM. The data transmission may include a mobile originated (MO) data transmission or a mobile terminated (MT) data transmission. In one example, the communication device may switch from the first power saving mode (e.g., eDRX) to the second power saving mode (e.g., PSM), if the data transmission or the paging does not occur within a plurality of discontinuous reception (DRX) cycles. In another example, the communication device may switch from the first power saving mode (e.g., eDRX) to the second power saving (e.g., PSM), if a RAU/TAU procedure does not occur in the time period. In addition, the communication device may switch from the first power saving mode to the second power saving mode by performing the RAU/TAU procedure and changing the IE "current power saving way" to the second power saving mode.

In one example, the communication device may first operate in the eDRX. In order to reduce more power consumption, the communication device may switch from the eDRX to the PSM, if the data transmission or the paging for the communication device does not occur within the time period (e.g., 5 minutes) and/or the plurality of DRX cycles (e.g., 5 DRX cycles). In addition, the time period may not include a RAU/TAU procedure. That is, the communication device may switch from the eDRX to the PSM, if the communication device does not receive the data or the paging in the present RAU/TAU period. Further, the communication device may trigger a new RAU/TAU procedure and change the IE "current power saving way" to the PSM, to complete the switch from the eDRX to the PSM.

As a result, according to the above description, the communication device may switch between the plurality of power saving modes to reduce more power consumption.

Figure 12:
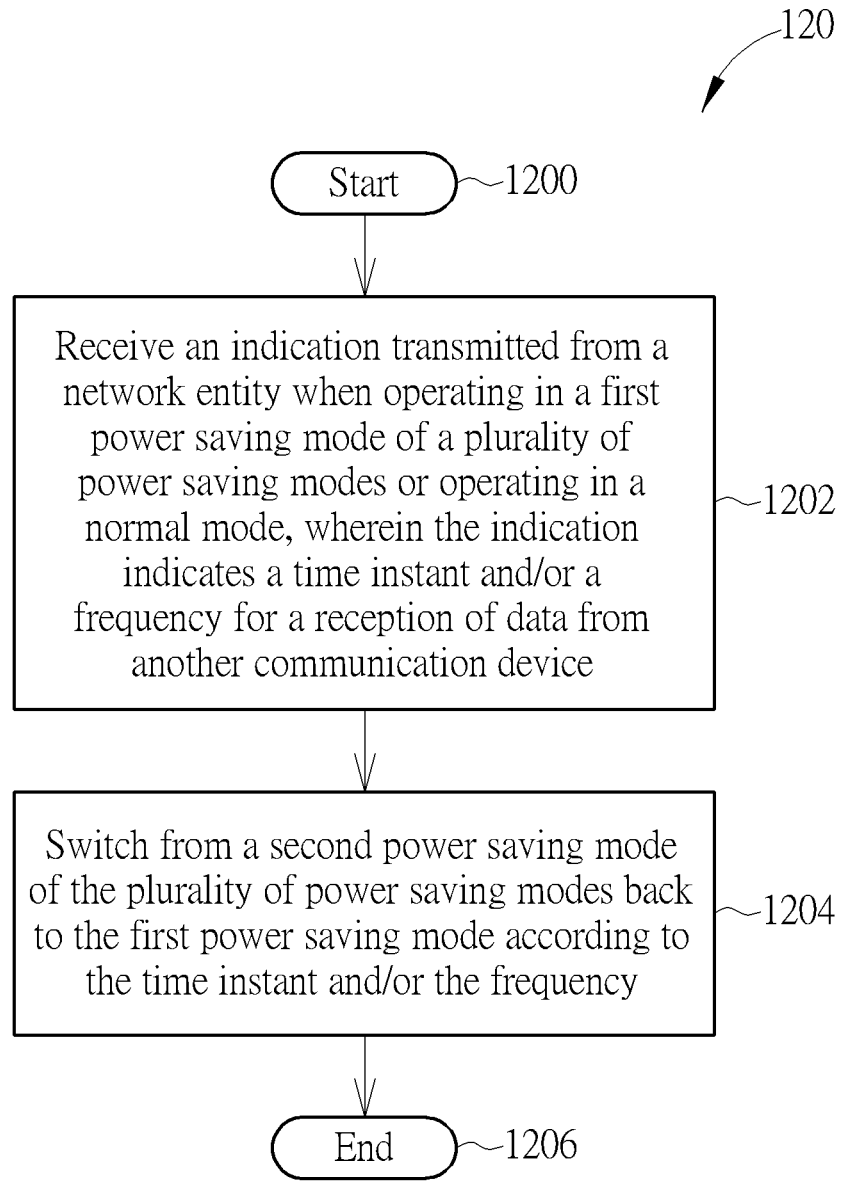
FIG. 12 is a flowchart of a process according to an example of the present invention.

FIG. 12 is a flowchart of process 120 according to an example of the present invention. The process 120 may be utilized in a communication device (e.g., communication device in FIG. 1) to handle power saving. The process 120 may be complied into the program code 214 and includes the following steps:

Step 1200: Start.

Step 1202: Receive an indication transmitted from a network entity when operating in a first power saving mode of a plurality of power saving modes or operating in a normal mode, wherein the indication indicates a time instant and/or a frequency for a reception of data from another communication device.

Step 1204: Switch from a second power saving mode of the plurality of power saving modes back to the first power saving mode according to the time instant and/or the frequency.

Step 1206: End.

According to the process 120, the communication device may receive an indication transmitted from a network entity when operating in a first power saving mode of a plurality of power saving modes or operating in a normal mode, wherein the indication indicates a time instant and/or a frequency for a reception of data from another communication device. Later, the communication device may switch from a second power saving mode of the plurality of power saving modes back to the first power saving mode according to the time instant and/or the frequency. That is, the communication device may receive the data transmitted from the other communication device by switching the second power saving mode back to the first power saving mode according to time instant and/or the frequency indicated by the indication. In addition, the communication device receives the indication before operating in (e.g., entering) the second power saving mode.

Realization of the present invention is not limited to the above description. The following example may be applied to the process 120.

In one example, the first power saving mode may be the eDRX, and the second power saving mode may be the PSM. In one example, the indication may include the time instant and/or the frequency of the data reception. That is, the data may be transmitted via the time instant and/or the frequency. The communication device may switch from the second power saving mode (e.g., PSM) to the first power saving mode (e.g., eDRX) by performing a RAU/TAU procedure and changing the IE "current power saving way" to the first power saving mode according to the indication. Further, the communication device may switch from the first power saving mode (e.g., eDRX) to the second power saving mode (e.g., PSM), if the communication device does not receive the data for a time period after the time instant and/or the frequency. That is, the communication device may switch from the first power saving mode to the second power saving mode by performing a RAU/TAU procedure and changing an IE "current power saving way" to the second power saving mode. In one example, the normal mode is different from the plurality of power saving modes. That is, the communication device may receive the indication transmitted from the network, before entering one of the plurality of power saving modes.

In one example, the communication device may receive the indication including the time instant and/or the frequency, when operating in the eDRX. The indication may indicate the communication device when to receive the data from the other communication device. That is, the communication device may receive the data according to the time instant and/or the frequency (e.g., 1 time per week). Thus, the communication device may switch from the PSM to the eDRX to receive the data according to the indication when operating in the PSM. Further, the communication device may trigger a RAU/TAU procedure and change the IE "current power saving way" to the eDRX, to switch from the PSM to the eDRX. In addition, the communication device may switch from the eDRX to the PSM for reducing more power consumption by triggering a RAU/TAU procedure again and changing the IE "current power saving way" to the PSM, if the communication device does not receive the data for a time period (e.g., 5 minutes) after the time instant and/or the frequency.

As a result, according to the above description, the communication device may switch the plurality of power saving modes to reduce more power consumption and to receive data according to an indication.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit (s) and/or mixed circuit (s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides a method for handling power saving. Information of power saving modes can be transmitted to network entities via corresponding messages, even though a communication device is in different wireless communication system (e.g., LTE or UMTS). In addition, the communication device may switch between a plurality of power saving modes to reduce more power consumption and to receive data according to an indication.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device of handling power saving, comprising:
    a storage device; and
    a processing circuit, coupled to the storage device, wherein the storage device stores, and the processing circuit is configured to execute, the instructions of:
    transmitting a first message comprising capability information to an access network, wherein the capability information indicates a plurality of power saving modes of the communication device;
    selecting a power saving mode from the plurality of power saving modes; and
    transmitting a second message comprising the power saving mode and at least one power saving parameter related to the power saving mode to a core network.

2. The communication device of claim 1, wherein the first message comprises a user equipment (UE) Capability Information message, and the access network comprises a base station.

3. The communication device of claim 2, wherein the capability information comprises an information element (IE) "UE-EUTRA-Capability".

4. The communication device of claim 2, wherein the second message comprise an attach/tracking area update (TAU) request message, and the core network comprises a mobility management entity (MME).

5. The communication device of claim 1, wherein the first message comprises a radio resource control (RRC) Connection Setup Complete message, and the access network comprises a radio network controller (RNC).

6. The communication device of claim 5, wherein the capability information comprises an information element (IE) "UE radio access capability".

7. The communication device of claim 5, wherein the second message comprise an attach/routing area update (RAU) request message, and the core network comprises a mobile switching center/serving GPRS support node (MSC)/(SGSN).

8. The communication device of claim 1, wherein the power saving mode is indicated by an information element (IE) "current power saving way" in the second message.

9. The communication device of claim 1, wherein the first message and the second message are transmitted via a radio resource control (RRC) layer.

10. The communication device of claim 1, wherein the plurality of power saving modes comprise an extended discontinuous reception (eDRX) and a power saving mode (PSM).

11. The communication device of claim 1, wherein the communication device transmits the first message to the access network, when performing a registration procedure.

12. The communication device of claim 10, wherein the power saving mode is the eDRX, and the at least one power saving parameter comprises an extended long paging discontinuous reception (DRX) indicator and/or a user equipment (UE) specific extended long paging DRX indicator.

13. The communication device of claim 10, wherein the power saving mode is the PSM, and the at least one power saving parameter comprises a preferred periodic updating timer and/or a preferred active timer.

14. A communication device of handling power saving, comprising:
    a storage device; and
    a processing circuit, coupled to the storage device, wherein the storage device stores, and the processing circuit is configured to execute, the instructions of:
    selecting a power saving mode from a plurality of power saving modes of the communication device; and
    transmitting a message comprising capability information, the power saving mode and at least one power saving parameter related to the power saving mode to at least one of an access network and a core network, wherein the capability information indicates the plurality of power saving modes.

15. The communication device of claim 14, wherein the capability information comprises an information element (IE) "MS network capability".

16. The communication device of claim 14, wherein the power saving mode is indicated by an information element (IE) "current power saving way" in the message.

17. The communication device of claim 14, wherein the plurality of power saving modes comprise an extended discontinuous reception (eDRX) and a power saving mode (PSM).

18. The communication device of claim 17, wherein the power saving mode is the eDRX, and the at least one power saving parameter comprises an extended long paging discontinuous reception (DRX) indicator and/or a user equipment (UE) specific extended long paging DRX indicator.

19. The communication device of claim 17, wherein the power saving mode is the PSM, and the at least one power saving parameter comprises a preferred periodic updating timer and/or a preferred active timer.

20. The communication device of claim 14, wherein the at least one of the access network and the core network comprises a mobility management entity (MME) or a mobile switching center/serving GPRS support node (MSC/SGSN).

21. The communication device of claim 14, wherein the message comprises an attach/routing area update (RAU)/tracking area update (TAU) request message.

22. The communication device of claim 14, wherein the message is transmitted via a non-access stratum (NAS) layer.

* * * * *